No. 625,667. Patented May 23, 1899.
O. V. GEER.
NUT LOCK.
(Application filed Apr. 21, 1898.)
(No Model.)
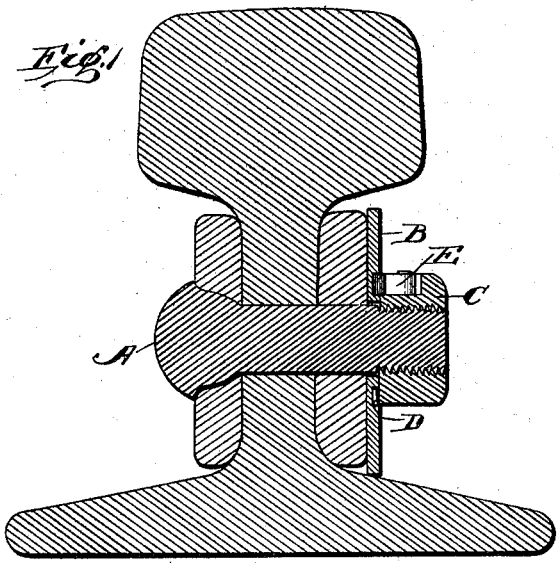
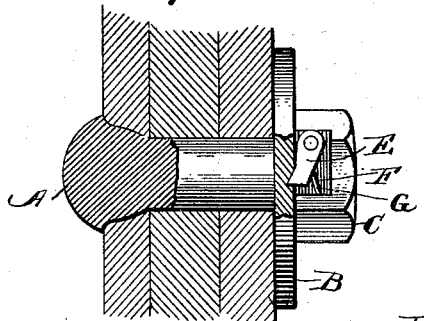
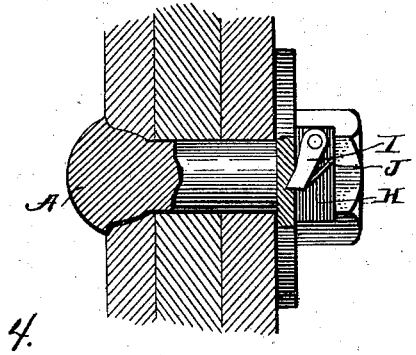
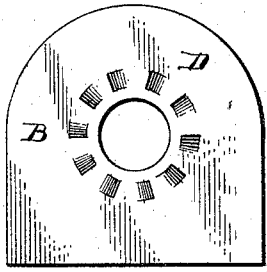
Witnesses
J. M. Fowler Jr
Russell Talcott
Inventor:
Orlando V. Geer
By Farrell Fowler & Farrell
Attorneys.
THE NORRIS PETERS CO., PHOTO-LITHO., WASHINGTON, D. C.

UNITED STATES PATENT OFFICE.

ORLANDO V. GEER, OF SIMPSON, MINNESOTA.

NUT-LOCK.

SPECIFICATION forming part of Letters Patent No. 625,667, dated May 23, 1899.

Application filed April 21, 1898. Serial No. 678,370. (No model.)

*To all whom it may concern:*

Be it known that I, ORLANDO V. GEER, a citizen of the United States, residing at Simpson, in the county of Olmsted and State of Minnesota, have invented certain new and useful Improvements in Nut-Locks, of which the following is a specification.

My invention relates to nut-locks, and more particularly to that class known as "base, key, and ratchet."

My nut-lock is more particularly adapted for railway use, though it may be used for various purposes by slight alterations in the base-washer without varying materially from the nature of the invention, the object being to construct a device of this kind which can be easily manufactured and placed on the market at a very small cost.

Another object of my invention is to provide a nut-lock which can be easily and quickly applied and is efficient, reliable, and convenient in use.

With these objects in view my invention consists in the particular construction of the various parts and in the novel manner of combination or arrangement of said parts, all of which will be described hereinafter, and pointed out in the claim.

In the drawings forming a part of this specification, Figure 1 is a cross-sectional view of the improvement as applied. Fig. 2 is a side elevation with part in section. Fig. 3 illustrates a modified form of my improved nut. Fig. 4 is a plan view of the washer.

Referring by letters to the drawings, A represents a bolt adapted to receive a washer B, the inner face of which rests against the article to be secured in place, and the outer face abuts the nut C, screwing in the usual manner on the outer threaded end of the bolt. In the outer face of the washer or the face which abuts the nut is arranged around the aperture therein a series of inclined recesses D, adapted to be engaged by a pawl E, which is secured in the right-angular cut-away portion F near the base upon one face of the nut and held in engagement by the spring G, secured in the edge of the said cut-away portion. The flanges on the rail engage the edges of the washer, thus securing the same in a fixed position. However, I do not limit myself to this arrangement, as the washer when used upon woodwork, such as bridges, &c., may be provided with teeth upon the inner face adapted to bite into the wood, and when my improved nut-lock is used in connection with iron structures the washer may be done away with by forming the ratchet-teeth upon the face of the article around the aperture adapted to receive the bolt.

Fig. 3 is a modified form of my improved nut, having the lower portion of one face cut away, as shown at H, and a pawl I, secured in the cut-away portion and held in engagement with the recesses in the washer by the spring J, secured in the face of the nut above the pawl.

I deem the foregoing explanation sufficiently plain that the improvement will be readily understood by all conversant with such matters, the extreme simplicity rendering an elaborate description unnecessary.

Having thus described the various features of my invention, what I claim as new, and desire to secure by Letters Patent, is—

In a nut-lock, the combination of the washer having a series of inclined recesses arranged around the aperture therein, and a nut having a cut-away portion upon one face, a pawl secured in the said cut-away portion, adapted to be held in engagement with the said recesses, by a flat spring, the said spring secured in the edge of the said cut-away portion by one end, substantially as shown and for the purpose set forth.

In testimony whereof I affix my signature in presence of two witnesses.

ORLANDO V. GEER.

Witnesses:
C. E. CALLAGHAN,
ARTHUR J. SISSON.